: 2,970,141
Patented Jan. 31, 1961

2,970,141

PROCESS FOR PREPARING DEXTRAN PHOSPHATES

Alfred E. Bishop and Leo J. Novak, Dayton, Ohio, assignors to The Commonwealth Engineering Company of Ohio, Dayton, Ohio, a corporation of Ohio No Drawing. Filed Sept. 24, 1954, Ser. No. 458,278

5 Claims. (Cl. 260—234)

This invention relates to phosphates of dextran and dextranic acid and sodium salts thereof, and to methods of making the same.

The object of the invention is to provide a new series of substances derived from dextran or "dextranic acid" and containing the phosphate radical.

In general, the new derivatives are obtained by reacting the selected dextran, an alkali metal salt thereof, or the alkali metal salt of "dextranic acid," with phosphorous oxychloride in an inert liquid which is a dispersing medium or diluent for the reactants, at temperatures of 50° C. to 90° C. for time periods varying between 25 minutes and 3 hours, and then working up the crude reaction product to obtain the phosphate in the form of a white powder or granular material.

The dextran may be obtained by the action of dextran-synthesizing microorganisms of the *Leuconostoc mesenteroides* and *L. dextranicum* types on sucrose. Microorganisms (or the enzymes thereof) which may be used to effect the biosynthesis include those bearing the following NRRL (Northern Regional Research Laboratory) designations: *Leuconostoc mesenteroides* B-512, B-119, B-1146, B-1190, B-742, B-1191, B-1196, B-1208, B-1216, B-1120, B-1144, B-523; *Streptobacterium dextranicum* B-1254 and *Betabacterium vermiforme* B-1139. In general the dextran may have a molecular weight of 5000 to $150 \times 10^6$ as determined by light scattering, a molecular structural repeating alpha-1,6 to non-1,6 linkages ratio of 1.9:1 to 30:1, and be readily or difficultly soluble in water or substantially insoluble therein.

The substance "dextranic acid" is a carboxylated polymer having a molecular weight between 5000 and 50,000 determined by light scattering measurements which, as disclosed in the pending application of L. J. Novak et al., Ser. No. 377,232, filed August 28, 1953, is produced as a by-product when the enzyme elaborated by the mold *Aspergillus Wentii* is mixed with an aqueous solution of relatively high molecular weight dextran and acts on the latter to split it into dextran segments of relatively lower molecular weight.

As further disclosed in said pending application, when alcohol is added to the aqueous solution containing the hydrolyzed dextran, for precipitating the latter at pH 1.0 to 5.0, and the precipitate is separated, the carboxylated polymer by-product remains in the alcoholic supernatant, and may be recovered from the supernatant by adjusting the pH of the latter to a value between 8.0 and 13.9, preferably about 11.0, with 50% alcoholic (methanolic) sodium hydroxide. The sodium salt of the by-product, sodium dextranate, precipitates as a white powder. By dissolving the salt in water at neutral or acid pH, adding an equal amount of lower aliphatic alcohol to the solution, and alkalinizing the alcohol-water mixture to a pH of about 12.0, the carboxylated polymer ("dextranic acid") is precipitated as a white powder which forms aqueous solutions of low relative and intrinsic viscosity, and combines with bases to form salts.

The following examples are illustrative of specific embodiments of the invention.

Example I

Five and four tenths gms. of B-512 dextran having a molecular weight of 75,000±15,000, were mixed with 150 ml. of pyridine at room temperature and the mixture was transferred to a reaction apparatus equipped with a reflux column and agitator for completion of the dissolution under reflux. The solution was then cooled to 5° C. by immersing the reaction chamber in an ice bath. During the cooling, moisture was excluded from the apparatus by means of "Drierite" (a dessicant which is a commercially available form of anhydrous calcium sulfate) in a trap attached to the reflux column. About 51.1 gms. of phosphorus oxychloride were slowly added to the cold dextran solution with continuous agitation of the latter. Thereafter, the cold water bath was heated until the reaction mass had a temperature of 85° C. to 87° C., and the mass was heated at that temperature for 1.5 hours, with agitation.

The reaction mixture was poured onto 200 gms. of ice, the flask was washed with 200 ml. of water at 5° C., and both solutions were combined and cooled to 25° C. The pyridine phase was then decanted off and the aqueous reaction phase (pH 3.8) was adjusted to pH 7.0 by the addition of 4 N sodium hydroxide. The phosphate was then precipitated as a flocculent white material by pouring the neutral aqueous solution into 7 volumes of vigorously agitated methanol. The precipitate was separated by vacuum filtration and washed twice with 400 ml. of 95% methanol. After drying under vacuum at 30° C. to 40° C., the dextran phosphate was obtained as a greyish-white product.

The dry dextran phosphate was dissolved in 150 ml. of water to obtain a slightly viscous solution containing approximately 10% solids and having pH 3.2. The pH of the solution was adjusted to 7.0 by addition of 4 N sodium hydroxide and the solution was poured into 10 volumes of methanol to precipitate the phosphate as a fine, white flocculent material, which was removed by vacuum filtration, washed twice with 100 ml. of 95% methanol and dried under vaccum at 35° C. to 40° C. to obtain the dextran phosphate as a fine white powder. The phosphate content of the ester was found to be equivalent to a D.S. (average number of phosphate groups per anhydroglucopyranosidic unit) of 0.4 when calculated as the sodium phosphate salt of dextran.

Example II

Four gms. of sodium dextranicate (sodium salt of "dextranic acid") were agitated at 70° C. with 27.0 ml. of 85% phosphoric acid and 18.6 ml. of phosphorus oxychloride in 250 ml. of benzene, for 25 minutes, on the water bath, using apparatus equipped with a reflux column fitted with a dehydrating chamber ("Drierite") for preventing access of moisture from the air to the reaction mixture. After the 25 minutes heating period, the reaction mass, containing a dark brown gum, was cooled to 5° C. The benzene phase was decanted off and washed with 50 ml. of 4 N sodium hydroxide solution. The alkaline washings were added to the cold brown-colored acid reaction mixture and the combined solutions were adjusted to pH of 6.1 by addition of 4 N sodium hydroxide. The solution was filtered to remove insolubles, after which the reaction product was precipitated by slowly adding the filtrate to 7 volumes of continuously agitated methanol. After settling the supernatant was decanted off and discarded. The residual cream-colored gummy precipitate was washed twice with 100 ml. of a 1:1 volume mixture of water and methanol to remove contaminating phosphate salts. The washed product was dissolved in 300 ml. of water heated to 60° C. to obtain a solution of pH 6.5.

The pH of the solution was adjusted to 7.0 by addition of 4 N sodium hydroxide and poured into 16 volumes of vigorously agitated methanol to precipitate the sodium "dextranic acid" phosphate as a fine, white granular material. When the precipitate had settled (about 30 minutes) the supernatant was decanted off and the phosphate was dried under vacuum at 30° C. to 40° C. The sodium "dextranic acid" phosphate thus obtained was light brown, and hygroscopic. The combined phosphate content was found to be equivalent to 0.77 unit when calculated as the $O.PO_3Na_2$ radical of $C_6H_7O_2(OH)_2OPO_3Na_2$. The free acid ester "dextranic acid" phosphate may be recovered from the salt.

The method exemplified can be used to prepare the phosphates of other dextrans of different molecular weights and 1,6 to non-1,6 linkages ratios as previously indicated. These esters and salts exhibit interesting physiological action. For example, aqueous solutions of the dextran phosphates, when injected into the vein of rabbits, exhibited a hyperglycemic effect opposite to that of insulin, inducing a two-fold increase in blood glucose content of the rabbit within 30 minutes after the injection, and also caused a definite stimulation of the nervous system of the rabbit.

Instead of benzene and pyridine, other inert organic solvents may be used as diluent for the reactants, such as xylene, for example. When the sodium salt of dextran or of "dextranic acid" is reacted with a mixture of phosphoric acid and phosphorus oxychloride, the phosphoric acid functions as a diluent and combiner with the sodium atoms to provide the dextran hydroxly groups in a reactive form for the phosphorus oxychloride esterifying agent.

The relative proportions of the dextran, sodium dextran, sodium dextranicate and the esterifying phosphorus oxychloride may vary somewhat. Usually the relative proportions are such that the molar ratio of the reactants is from 0.5:1 to 1:1.

The sodium salts of "dextran phosphate and dextranic acid" phosphate are also of physiological interest.

Using the general procedures outlined, other alkali metal salts of dextran and "dextranic acid" may be used as starting material, such as the potassium and lithium salts. Those salts of the dextran phosphate and "dextranic acid" phosphate may also be obtained as final product.

What is claimed is:

1. The method of producing a substantially pure, white, granular product consisting essentially of a phosphate of a substance selected from the group consisting of (a) dextran having a molecular weight between about 60,000 and about 90,000 and (b) the sodium salt of the carboxylated polymer having a molecular weight between 5,000 and 50,000 produced as by-product in the production of said dextran from dextran of relatively higher molecular weight by hydrolysis of the latter by the enzyme elaborated by the mold *Aspergillus Wentii*, which comprises heating a reaction mixture consisting essentially of the substance selected from (a) and (b) and phosphorus oxychloride in a molar ratio of 0.5:1 to 1:1, in an inert organic liquid dispersant for the reactants, at a temperature between 50° C. and 90° C. for from 25 minutes to 3 hours, and under conditions which prevent access of moisture to the reactants, cooling the reaction mass to about 5° C., decanting off the inert dispersant, neutralizing the residue in water, adding a lower aliphatic alcohol to the neutral aqueous mass to precipitate the phosphate of the substance selected from (a) and (b), recovering the precipitate, dissolving the precipitate in water, neutralizing the solution, and adding a lower aliphatic alcohol to the neutral solution to precipitate the phosphate in pure condition as a white, granular powder.

2. The method according to claim 1, characterized in that the substance heated with the phosphorus oxychloride is dextran having a molecular weight between about 60,000 and about 90,000.

3. The method according to claim 1, characterized in that the substance heated with the phosphorus oxychloride is the sodium salt of the carboxylated polymer having a molecular weight between 5,000 and 50,000 and produced as by-product in the production of dextran having a molecular weight between about 60,000 and about 90,000 from dextran of relatively higher molecular weight by hydrolysis of the latter by the enzyme elaborated by the mold *Aspergillus Wentii*.

4. The method according to claim 1, characterized in that the inert dispersant for the reactants is pyridine.

5. The method according to claim 1, characterized in that the inert dispersant for the reactants is benzene.

References Cited in the file of this patent

UNITED STATES PATENTS

| | | |
|---|---|---|
| 2,024,036 | Funaoka | Dec. 10, 1935 |
| 2,256,380 | Dickey | Sept. 16, 1941 |